No. 825,695. PATENTED JULY 10, 1906.
J. BEAUDET.
DRAWER SLIDE.
APPLICATION FILED NOV. 13, 1905.

4 SHEETS—SHEET 1.

Witnesses:
J. Henry Parker
Alice Tarr

Inventor:
John Beaudet
by Macleod, Calver, Copeland & Dike
Attorneys

No. 825,695. PATENTED JULY 10, 1906.
J. BEAUDET.
DRAWER SLIDE.
APPLICATION FILED NOV. 13, 1905.

4 SHEETS—SHEET 2.

Witnesses:
J. Henry Parker
Uline Tarr

Inventor:
John Beaudet
by Macleod, Calver, Copeland & Dike
Attorneys.

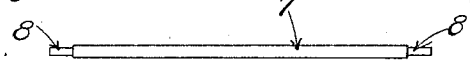
Fig. 8.  Fig. 9.
Fig. 10.
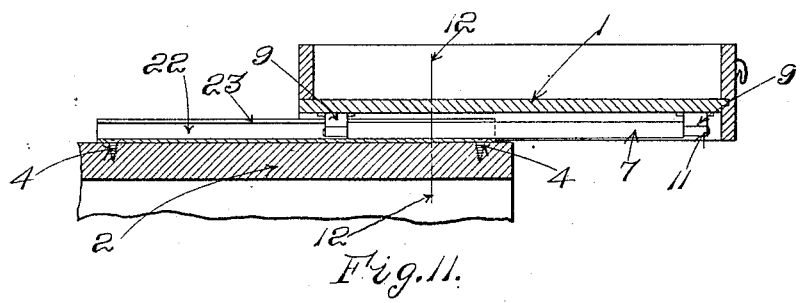
Fig. 11.
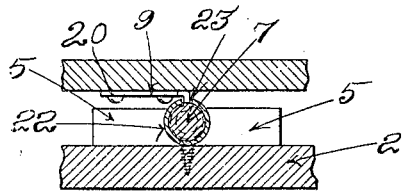
Fig. 12.
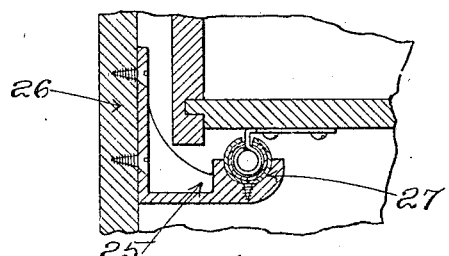
Fig. 13.

UNITED STATES PATENT OFFICE.

JOHN BEAUDET, OF SOMERVILLE, MASSACHUSETTS.

DRAWER-SLIDE.

No. 825,695.　　　Specification of Letters Patent.　　　Patented July 10, 1906.

Application filed November 13, 1905. Serial No. 286,985.

*To all whom it may concern:*

Be it known that I, JOHN BEAUDET, a citizen of the United States, residing at Somerville, county of Middlesex, State of Massachusetts, have invented a certain new and useful Improvement in Drawer-Slides, of which the following is a specification, reference being had therein to the accompanying drawings.

In cabinet construction—such as tables, desks, bureaus, &c.—in which drawers are provided when the drawer is made to slide on wood the swelling and shrinking of the wood frequently prevent smooth working of the drawer.

The object of my invention is to provide metallic slides, so that the drawer shall not slide at all on the wood, so that the swelling and shrinking of the wood will not affect the working of the drawer.

The device comprises, mainly, a fixed tube attached to a support beneath the drawer and a rod attached to the under side of the drawer, which telescopes into the fixed tube, and in the preferred form of construction it also comprises a second tube within said fixed tube and slidable with relation thereto, the slide-rod being within said inner tube and slidable with relation thereto for the purpose of giving a greater telescopic movement, the rod being mounted in brackets or hangers on the under side of the drawer and the tubes being grooved or split longitudinally on the upper side to allow travel of the shanks of the brackets which carry the drawer and permit a telescopic movement of the rod and also of the intermediate tube where two tubes are employed.

The invention will now be fully described, reference being had to the accompanying drawings, and the novel features thereof will be particularly pointed out in the claims at the close of the specification.

Figure 1:
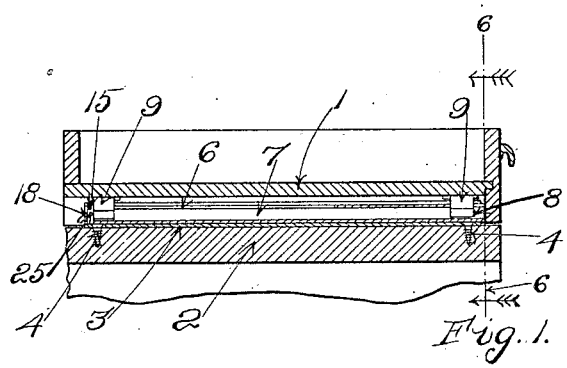
Figure 2:
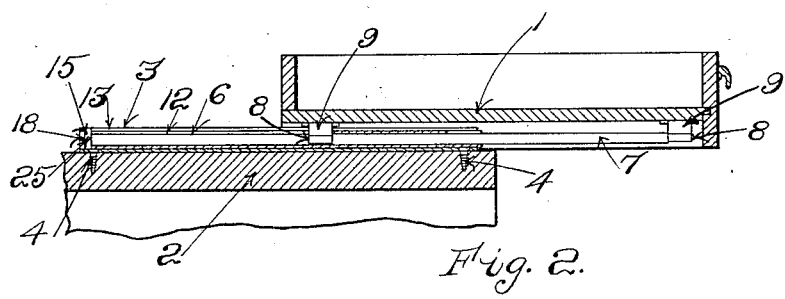
Figure 3:
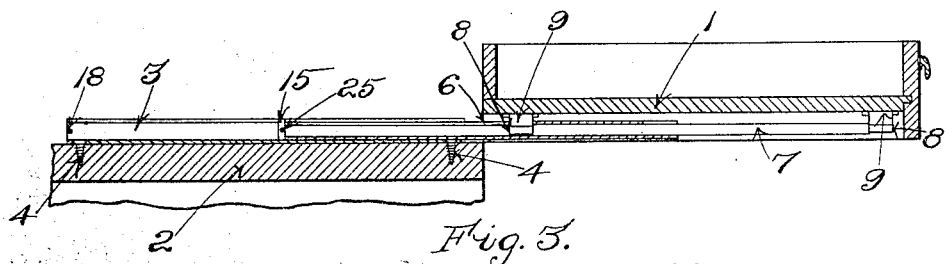
Figure 6:
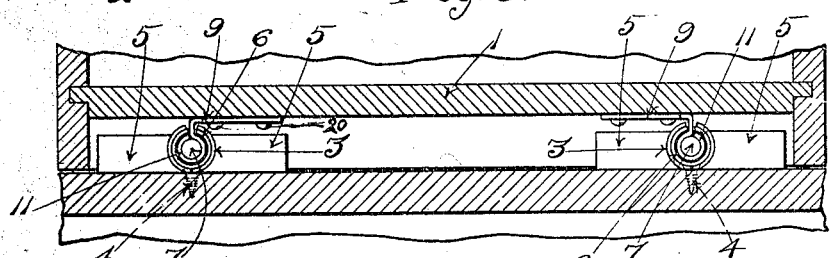
Figure 4:
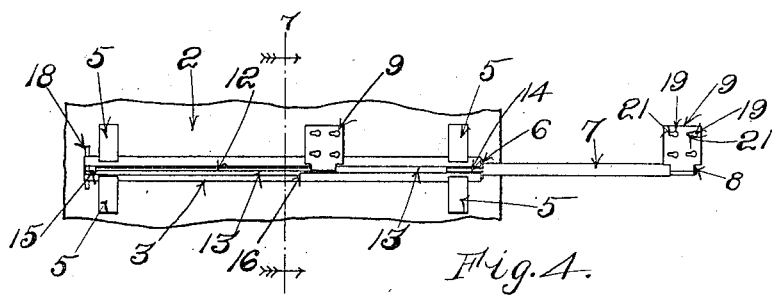
Figure 5:
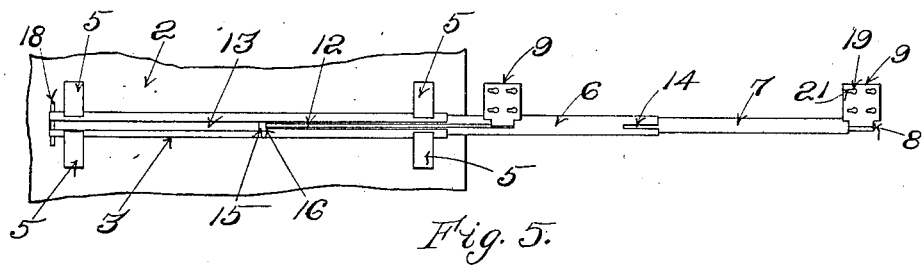
Figure 7:
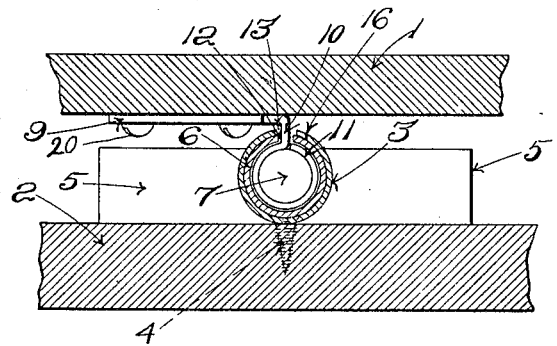
Figure 14:
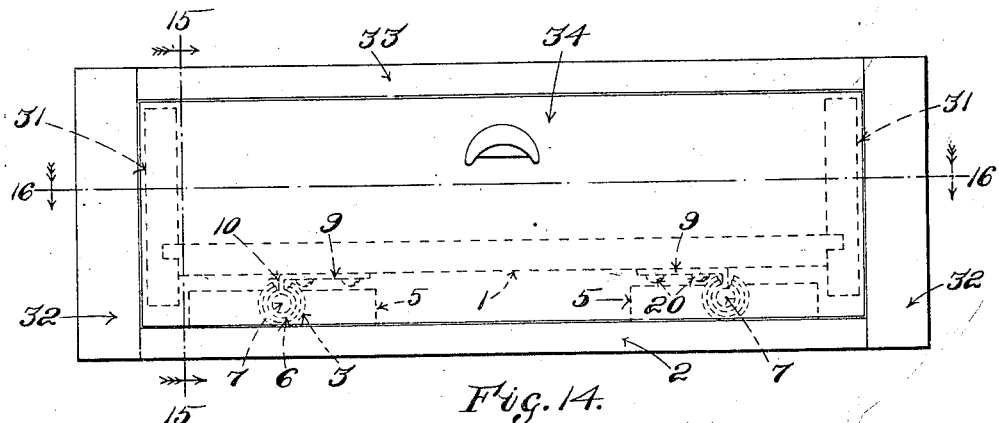
Figure 15:
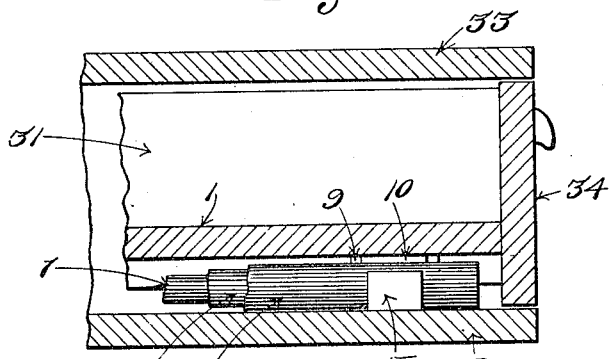
Figure 16:
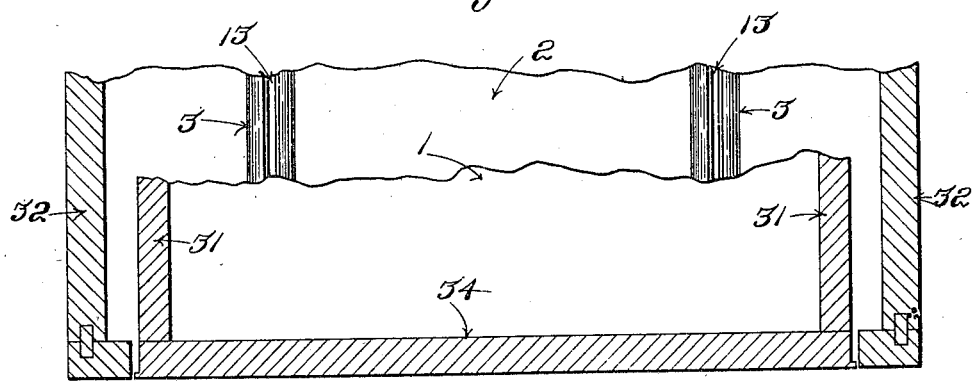

In the drawings, Figure 1 is a longitudinal vertical section showing a drawer and partition with slide attached in which a rod and two tubes are employed, the drawer being shown closed. Fig. 2 is a longitudinal vertical section showing the drawer partly open, the rod being drawn out the full length of the rear slot in the inner tube. Fig. 3 is a longitudinal vertical section with the drawer fully opened drawn out the full length of movement of the slide-rod and inner tube. Fig. 4 is a plan of the slide attached to the horizontal partition beneath the drawer, the drawer being removed for clearness of illustration, the brackets, however, being shown on the rod for attachment to the bottom of the drawer and the rod being drawn out as far as it will go before drawing out the inner tube. Fig. 5 is a plan of the same parts as Fig. 4, the rod and inner tube both being drawn out their full length of movement. Fig. 6 is a cross-section on line 6 6 of Fig. 1 just back of the front wall of the drawer to show the front end view of the slide, there being two parallel slides shown to properly support the drawer, one near each side. Fig. 7 is an enlarged section on line 7 7 of Fig. 4. Fig. 8 is a detail plan view of the outer tube. Fig. 9 is a detail plan view of the inner tube. Fig. 10 is a detail of the rod which slides in the inner tube. Fig. 11 is a longitudinal vertical section showing a modified form of drawer-slide in which there is only one tube and a rod employed, there being no intermediate sliding tube. Fig. 12 is a cross-section on line 12 12 of Fig. 11. Fig. 13 is a sectional view showing a modified form of support for the slide. Fig. 14 is a front elevation of a drawer constructed in accordance with my invention connected with a casing or cabinet. Fig. 15 is a vertical section on an enlarged scale and partly broken away on line 15 15 of Fig. 14. Fig. 16 is a horizontal section on line 16 16 of Fig. 14 on an enlarged scale and partly broken away.

Referring now to the drawings, 1 represents the bottom of the drawer of a bureau or other piece of cabinet furniture, and 2 represents the horizontal partition below the drawer. A metal tube 3 is secured to the upper side of the partition 2 in any suitable way. In the drawings it is shown as being fastened by screws 4 and also as held by braces 5 to prevent movement of said tube 3 either longitudinal or rotary. Sliding within said tube 3 is a tube 6, and sliding within said inner tube 6 is a rod 7. The rod 7 is preferably provided with a reduced portion 8 at each end for journaling in the brackets.

Preferably the tubes and the rod are of steel; but I do not limit myself to the particular kind of metal.

Brackets or hangers 9 are secured to the under side of the drawer 1 near each end. Each bracket or hanger is formed with a shank 10, bent down at right angles to the base of the bracket and terminates in a barrel 11, through which the reduced end 8 of the rod 7 passes. The inner tube 6 is formed with a longitudinal groove or slot 12 in the upper side extending forward from the rear end for a considerable portion of its length, and the outer tube 3 is also formed with a groove or slot 13 for its full length, the shank of the bracket extending through these slots 12 13 to permit travel of the shank of the bracket longitudinally with relation to the tubes, and thereby permit sliding of the drawer. There is also formed in the forward end of the inner tube a slot 14 to permit sliding of the bracket a limited distance therein, so that the rod 7 can be moved entirely back into the tube.

The rear portion of the slot 13 in the outer tube 3 is wider than the forward portion, forming a shoulder 16 in the side of the slot at the forward end of the wider portion thereof. On the rear end of the inner tube 6 is a stop 15, which engages with said shoulder 16, which when the inner tube is drawn forward by the opening of the drawer engages with said shoulder 16 to limit the length of movement of the inner tube, as shown in Fig. 2.

The full forward movement of the drawer is limited by the shank 10 of the rear bracket engaging with the forward end of the slot in the inner tube 6, as shown in Fig. 3. The rearward movement of the drawer in closing is limited by suitable stops. In the construction shown in the drawings the rearward movement of the inner tube is limited by the stop 15 on the rear end of the inner tube coming in contact with a stop 18 in the rear end of the outer tube, and the rearward movement of the rod 7 is limited by coming in contact with said stop 15 on the rear end of the inner tube.

Preferably the stop 15 on the rear end of the inner tube and the stop 18 on the rear end of the outer tube are both removable, the end of said tubes being otherwise open to permit insertion of the rear bracket. The form of stop 18 on the rear end of the outer tube shown in the drawings is a removable pin, and the stop 15 on the inner tube is a block held in place by a removable pin 25; but the particular kind of removable stop is not material.

The preferred method of fastening the brackets to the drawer is to provide the base of the brackets with slots 19 large enough for the passage of the head of the screws 20, having smaller slots 21, which lead from the larger slots 19 and which are wide enough for the shanks of the screws, but not wide enough for the heads of the screws to pass through, so that by slightly loosening the screws the brackets may be slipped along far enough to bring the heads of the screws into the larger portions of the slots, and the drawer may then be disengaged from the brackets when it is desired for any purpose to entirely remove the drawer for any purpose.

In the modification shown in Figs. 11 and 12 there is no sliding inner tube. The rod 7 and brackets 9 are similar to the rod and brackets already described. The rod 7 slides directly within the fixed tube 22, and either the rod 7 should be made larger than the rod 7 in the construction previously described or else the tube 22 should be made smaller than the fixed tube previously described, so that the slide-rod will not be too loose within the tube. The groove or slot 23 in the upper side of the tube 22, through which the shanks of the brackets travel, may be of uniform width throughout, as it is not necessary to have any stop to limit the forward movement of the drawer. It is also unnecessary to have any stop at the rear end of the slot 23.

In the modification shown in Fig. 13 the slides are supported by brackets 25, secured to the sides of the casing 26, each having a concave groove 27, which forms a seat for the fixed tube. This bracket may be used instead of a partition 2 beneath the drawer. In each case there would be brackets on each side for each slide.

The sliding member 7, which is carried by the drawer and which I have called a "rod," is preferably a solid rod, but not necessarily so. It might be a tube; but on account of its small size in order to make it sufficiently strong it is preferably solid, and in the specification and claims where I use the word "rod" I mean this inner member which moves with the drawer, whether it be tubular or solid.

As will be apparent by reference to the drawings, especially Figs. 6, 7, 13, 14, 15, and 16, the drawer is supported entirely by the metal rod 7 and the tubes 3 and 6 and does not in any way bear against any of the partitions of the bureau or casing. It will be seen that the clearance-space between the sides 31 of the drawer and the sides 32 of the cabinet may be any amount desired, and the space between the bottom 1 of the drawer and the horizontal partition 2, to which the tube 3 is attached, is as great, at any rate, as the diameter of the tube 3, so that there can be no frictional contact between the bottom of the drawer and the partition, and the space between the upper edge of the side walls 31 of the drawer and the upper horizontal partition 33 may also be any amount desired, so that there will be no frictional contact of any part of the drawer with any of the partitions or side walls of the cabinet. The front wall 34 may extend downwardly below the bottom 1 of the drawer and extend upwardly above the side walls of the drawer sufficiently so that when the drawer is closed there will be no wide opening at the top or bottom.

What I claim is—

1. In combination with a drawer, a cabinet-frame therefor, two stationary parallel tubes fixed to the upper side of a horizontal partition in the cabinet at some distance in from the edge, the longitudinal axis of the tubes being in the line of direction that the drawer slides, a longitudinal guide-slot in the side of each of said tubes, two rods which are slidable respectively in said tubes each of said rods being connected with a pair of hangers which pass through said slot in the tube and are fixed to the bottom of the drawer, the drawer being of less width and depth than the opening in the cabinet in which it slides, whereby the drawer may be supported while being moved in and out of the cabinet without contact of the drawer with either the top, bottom or sides of the cabinet.

2. In combination with a drawer, a tube attached to a fixed support beneath the drawer, and having a longitudinal slot throughout its length, a slide-tube within said first tube having a longitudinal slot extending from the rear end forwardly a portion of the length of said tube, a second slot in said inner tube extending from the forward end part way rearwardly in line with the said rear slot therein, hangers which are secured to said drawer and which support said rod, one of said hangers passing through the rear slot in the inner tube and through the slot in the outer tube and another of said hangers passing through the forward slot in said inner tube and through the slot in said outer tube.

In testimony whereof I affix my signature in presence of two witnesses.

JOHN BEAUDET.

Witnesses:
WILLIAM A. COPELAND,
ALINE TARR